United States Patent
Koide et al.

(10) Patent No.: US 9,787,708 B2
(45) Date of Patent: Oct. 10, 2017

(54) INFORMATION PROCESSING APPARATUS, METHOD, AND MEDIUM

(71) Applicant: PFU LIMITED, Kahoku-shi, Ishikawa (JP)

(72) Inventors: Kazuhiro Koide, Kahoku (JP); Hiroshi Okuda, Kahoku (JP); Shoko Ando, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 0 days.

(21) Appl. No.: 14/030,281

(22) Filed: Sep. 18, 2013

(65) Prior Publication Data
US 2014/0123294 A1  May 1, 2014

(30) Foreign Application Priority Data
Oct. 26, 2012  (JP) .................................. 2012-236676

(51) Int. Cl.
*H04L 29/06*  (2006.01)

(52) U.S. Cl.
CPC .......... *H04L 63/1433* (2013.01); *H04L 63/10* (2013.01)

(58) Field of Classification Search
CPC ............................ H04L 63/10; H04L 63/1433
USPC ........................................................ 726/25
See application file for complete search history.

(56) References Cited

U.S. PATENT DOCUMENTS

| | | | |
|---|---|---|---|
| 6,898,768 B1 * | 5/2005 | Theodossy ................. | G06F 8/65 703/27 |
| 7,069,474 B2 * | 6/2006 | Atallah ...................... | G06F 8/60 714/38.14 |
| 7,080,371 B1 * | 7/2006 | Arnaiz et al. ................. | 717/170 |
| 7,191,435 B2 * | 3/2007 | Lau .......................... | G06F 8/65 714/38.1 |
| 7,516,367 B1 * | 4/2009 | Beltowski et al. .......... | 714/38.1 |
| 7,600,219 B2 * | 10/2009 | Tsantilis .................... | G06F 8/71 707/999.202 |
| 8,745,612 B1 * | 6/2014 | Semenzato ............... | G06F 8/65 717/170 |
| 2001/0044935 A1 | 11/2001 | Kitayama | |

(Continued)

FOREIGN PATENT DOCUMENTS

| | | | |
|---|---|---|---|
| JP | 2001-331324 A | 11/2001 | |
| JP | 2004-094290 A | 3/2004 | |

(Continued)

OTHER PUBLICATIONS

Notice of Reason for Rejection dated Apr. 26, 2016, issued in counterpart Japanese Patent Application No. 2012-236676, with English translation. (9 pages).

*Primary Examiner* — Michael Pyzocha
(74) *Attorney, Agent, or Firm* — Westerman, Hattori, Daniels & Adrian, LLP

(57) ABSTRACT

An inspection server is provided with a related-information acquisition unit which acquires program-related information related to a program installed in a node connected to a network segment, a condition determination unit which determines whether or not the program-related information satisfies a security condition, and a measure information acquisition unit which acquires, when it is determined that the program-related information does not satisfy the security condition, measure information for allowing the node to satisfy the security condition in accordance with an attribute of the program.

12 Claims, 8 Drawing Sheets

(56) References Cited

U.S. PATENT DOCUMENTS

| | | | |
|---|---|---|---|
| 2003/0100297 A1* | 5/2003 | Riordan et al. | 455/418 |
| 2004/0181790 A1* | 9/2004 | Herrick | 717/168 |
| 2005/0022176 A1* | 1/2005 | Ramachandran | G06F 8/65 717/170 |
| 2005/0066324 A1* | 3/2005 | Delgado et al. | 717/170 |
| 2005/0149920 A1* | 7/2005 | Patrizi | G06F 8/73 717/168 |
| 2005/0278775 A1* | 12/2005 | Ross | 726/2 |
| 2007/0055752 A1* | 3/2007 | Wiegand et al. | 709/220 |
| 2007/0294684 A1* | 12/2007 | Kumashiro et al. | 717/168 |
| 2008/0059123 A1* | 3/2008 | Estberg et al. | 702/188 |
| 2010/0058313 A1* | 3/2010 | Hansmann | G06F 8/68 717/168 |
| 2010/0063855 A1* | 3/2010 | Nguyen | 705/7 |
| 2010/0306319 A1* | 12/2010 | Brzozowski | 709/206 |
| 2011/0214114 A1* | 9/2011 | Vidal | G06F 8/71 717/170 |
| 2012/0005719 A1* | 1/2012 | McDougal | 726/1 |
| 2012/0136844 A1* | 5/2012 | Wada | G06F 8/65 707/695 |
| 2012/0166874 A1* | 6/2012 | Bernardez et al. | 714/26 |
| 2012/0167071 A1* | 6/2012 | Paek | 717/170 |
| 2012/0233605 A1* | 9/2012 | Lupu | G06F 11/0709 717/172 |

FOREIGN PATENT DOCUMENTS

| | | |
|---|---|---|
| JP | 2004-234208 A | 8/2004 |
| JP | 2006-072482 A | 3/2006 |
| JP | 2007-128450 A | 5/2007 |
| JP | 2008-021274 A | 1/2008 |
| JP | 2008-027322 A | 2/2008 |
| JP | 2008-129707 A | 6/2008 |
| JP | 2009-169781 A | 7/2009 |

* cited by examiner

*FIG. 5*

| | APPLICATION ID | SCOPE ID | STATE OF MAINTENANCE | UPDATE | DETECTION METHOD | ... |
|---|---|---|---|---|---|---|
| SCOPE INFORMATION | ... | ... | ... | ... | ... | ... |

| | APPLICATION SCOPE ID | DETAILED PATCH INFORMATION | CANDIDATE VERSION TO BE PROHIBITED/ CANDIDATE VERSION TO BE AUTHORIZED | URL | ... |
|---|---|---|---|---|---|
| VERSION INFORMATION | ... | ... | ... | ... | ... |

| | APPLICATION SCOPE ID | MESSAGE | URL | TROUBLESHOOTING PROGRAM | ... |
|---|---|---|---|---|---|
| MEASURE INFORMATION | ... | ... | ... | ... | ... |

41

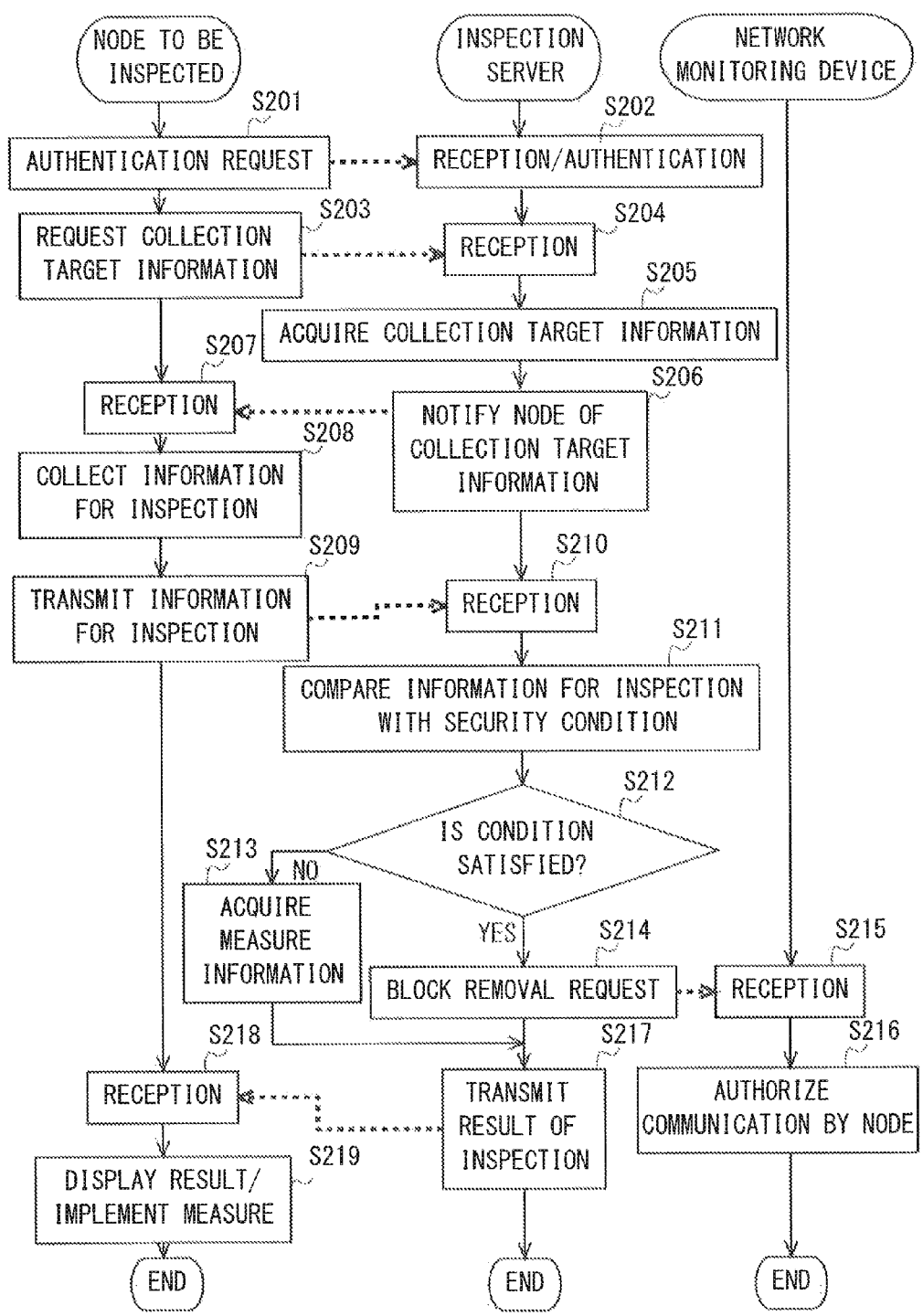

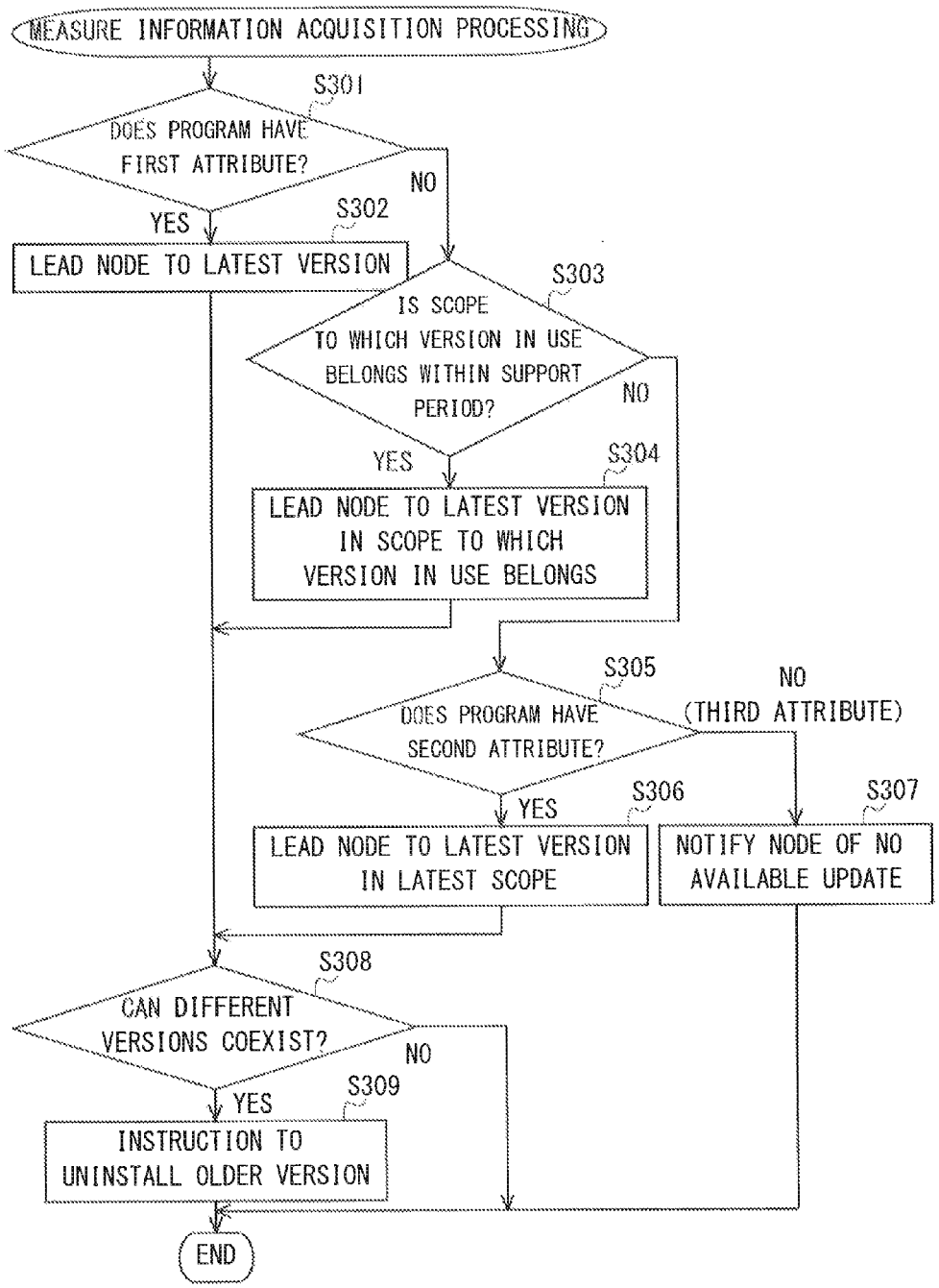

INFORMATION PROCESSING APPARATUS, METHOD, AND MEDIUM

CROSS-REFERENCE TO RELATED APPLICATION

This application is based upon and claims the benefit of priority of the prior Japanese Patent Application No. JP2012-236676, filed on Oct. 26, 2012, the entire contents of which are incorporated herein by reference.

FIELD

The present invention relates to a technology for managing terminals connected to a network.

BACKGROUND

There is a conventional communication system configured to deliver a warning message when a state is reached in which an information terminal is disconnected from a management network to be connectable to a destination network even though a security hole is not closed (see Japanese Patent Application Laid-open No. 2006-72482).

There is also a security measure administration apparatus configured to extract a hardware item which needs a security measure from among hardware items registered in an inventory information database based on a condition definition/determination script, set the content of the security measure for each of the hardware items, and register administration information which describes whether or not the security measure is needed for each of the hardware items in an administration information database, while generating a recommendation display screen which displays the set content of the security measure and causing the hardware to display the recommendation display screen (see Japanese Patent Application Laid-open No. 2004-234208).

SUMMARY

An information processing apparatus according to an aspect of the present invention includes a related information acquisition unit which acquires program-related information related to a program installed in a terminal connected to a network, a condition determination unit which determines whether or not the program-related information satisfies a predetermined security condition, and a measure information acquisition unit which acquires, when it is determined that the program-related information does not satisfy the security condition, measure information for allowing the terminal to satisfy the security condition in accordance with an attribute of the program.

The present invention can be construed as a method, or a program executed by a computer.

The present invention can be what results from recording such a program on a recording medium from which information is readable by a computer or another device or machine.

Here, the recording medium from which information is readable by a computer or the like refers to a recording medium in which information such as data or a program can be stored through an electrical, magnetic, optical, mechanical, or chemical process and from which the information can be read via a computer or the like.

BRIEF DESCRIPTION OF THE DRAWINGS

FIG. 5 is a view showing a configuration of dictionary data according to the embodiment;

FIG. 7 is a flow chart showing the flow of inspection processing according to the embodiment; and FIG. 8 is a flowchart showing the flow of measure information acquisition processing according to the embodiment.

DESCRIPTION OF EMBODIMENTS

An embodiment (hereinafter referred to as "the present embodiment") according to an aspect of the present invention will be described below based on the drawings. However, the present embodiment described below is only illustrative of the present invention in all respects and is not intended to limit the scope thereof. It will be appreciated that various improvements and modifications can be made in the present invention without departing from the scope thereof. That is, in implementing the present invention, specific configurations in accordance with embodiments may be used appropriately.

In the present embodiment, a description will be given of an embodiment when an information processing apparatus according to the present invention is implemented as an inspection server in an inspection system. However, the information processing apparatus according to the present invention can be widely used for the purpose of managing an information processing terminal belonging to a network, and a subject to which the present invention is applied is not limited to the inspection system.

<Configuration of System>

Figure 1:
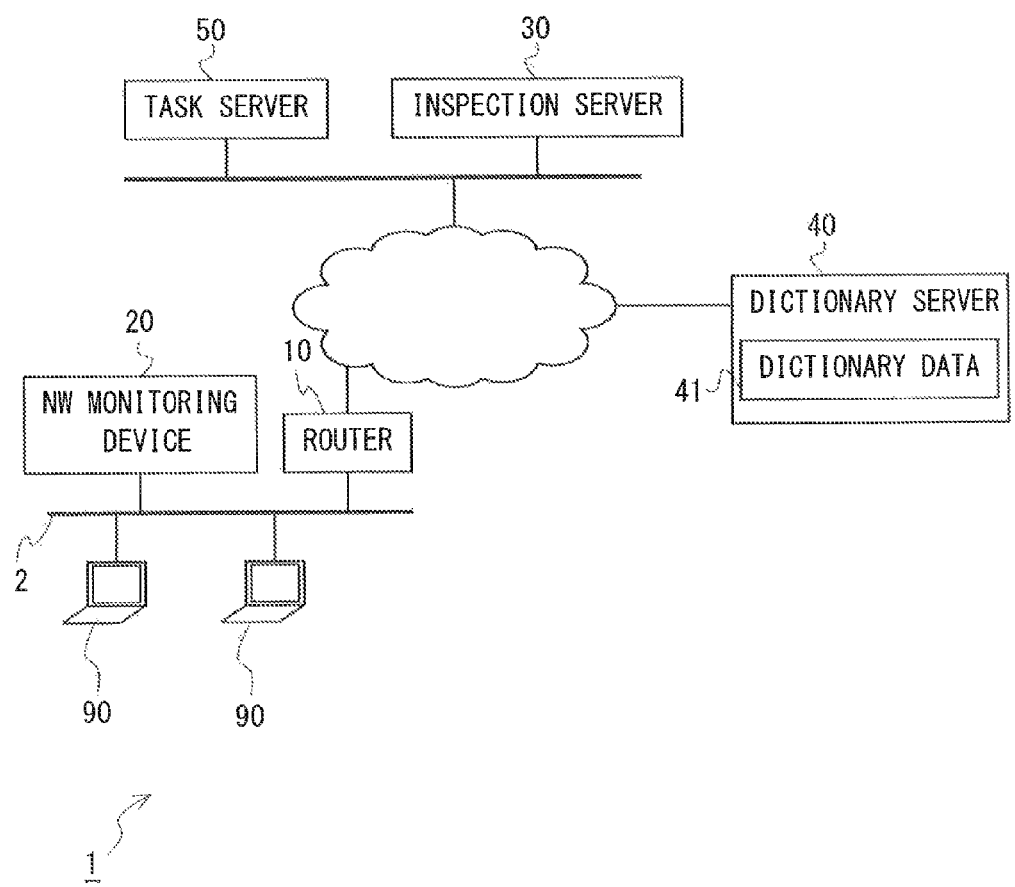
FIG. 1 is a schematic view showing a configuration of an inspection system according to an embodiment.

FIG. 1 is a schematic view showing a configuration of an inspection system 1 according to the present embodiment. The inspection system 1 according to the present embodiment includes a network segment 2 to which a plurality of information processing terminals 90 (hereinafter referred to as "nodes 90") to be inspected are to be connected, an inspection server 30 communicatively connected to the network segment 2 via a router 10, a task server 50, and a dictionary server 40. To the network segment 2, a network monitoring device (NW monitoring device) 20 for blocking communication by the node 90 which has not been inspected yet is connected. Note that the configuration of the network shown in the present embodiment is an exemplary embodiment, and another network configuration may be used. For example, the network monitoring device 20 may be included in a router or a switch.

The task server 50 provides a service for a task to each of the nodes 90. The inspection server 30 manages the network segment 2 and provides an inspection service to each of the nodes 90 connected to the network segment 2. In the present embodiment, the dictionary server 40 is a server which delivers dictionary data 41 used for a determination of a security state and a security measure in each of the nodes 90. Note that the dictionary data 41 held by the dictionary server 40 to be delivered is produced by the provider of the dictionary server 40 and can be edited by the manager of the inspection system. However, the dictionary server 40 may automatically generate the dictionary data 41 including a security condition and measure information based on a behavior of a program or a program (installer) for installing this program in any of the nodes 90. Note that information which can be assumed from a behavior of a program or the like will be described later.

In the inspection system 1 according to the present embodiment, various servers connected via the nodes 90 are connected at remote places via the Internet or a wide area network and provided by, e.g., an application service provider (ASP). However, these servers need not necessarily be connected at remote places. For example, these servers may be connected on a local network on which the nodes 90 and the network monitoring device 20 exist.

Figure 2:
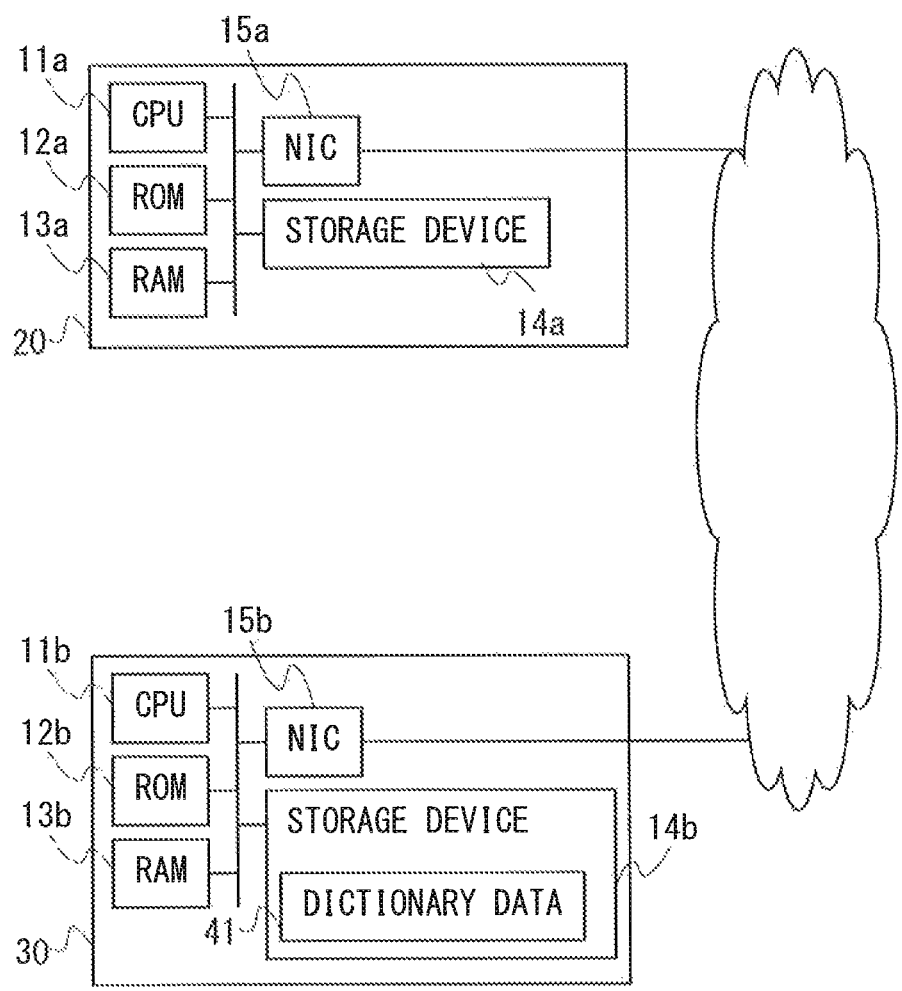
FIG. 2 is a view showing a hardware configuration of each of a network monitoring device and an inspection server according to the embodiment.

FIG. 2 is a view showing a hardware configuration of each of the network monitoring device 20 and the inspection server 30 according to the present embodiment. Note that, in FIG. 2, the illustration of the configuration (such as the router 10, the nodes 90, and the task server 50) except for the network monitoring device 20 and the inspection server 30 is omitted. The network monitoring device 20 and the inspection server 30 are computers respectively including central processing units (CPUs) 11*a* and 11*b*, random access memories (RAMS) 13*a* and 13*b*, read only memories (ROMs) 12*a* and 12*b*, storage devices 14*a* and 14*b* such as electrically erasable and programmable read only memories (EEPROMs) or hard disk drives (HDDs), and communication units such as network interface cards (NICs) 15*a* and 15*b*.

In the storage device 14*b* of the inspection server 30, besides a program for controlling the inspection server 30, the dictionary data 41 acquired from the dictionary server 40 is recorded. The dictionary data 41 includes information mainly for determining whether or not a security-related environment in each of the nodes 90 satisfies a predetermined security policy which can authorize participation in the network and connection to the task server 50 and implementing a measure as necessary. A detailed configuration of the dictionary data 41 will be described later using FIG. 5.

Figure 3:
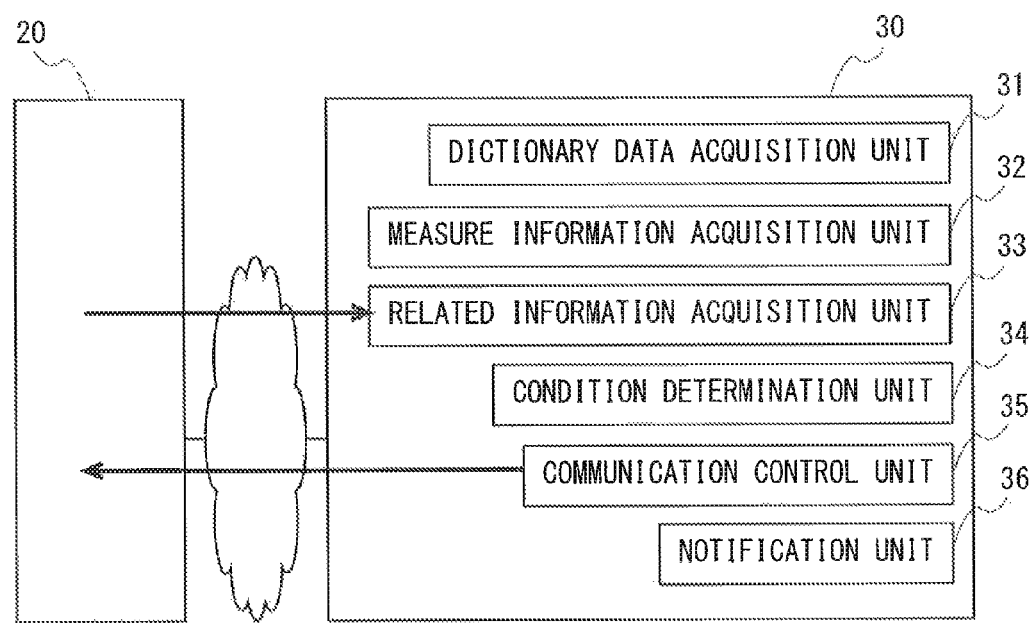
FIG. 3 is a view showing a schematic functional configuration of the inspection server according to the embodiment.

FIG. 3 is a view showing a schematic functional configuration of the inspection server 30 according to the embodiment. Note that, in FIG. 3, the illustration of the configuration (such as the router 10, the nodes 90, and the task server 50) except for the network monitoring device 20 and the inspection server 30 is omitted. The inspection server 30 functions as the information processing apparatus including a dictionary data acquisition unit 31, a measure information acquisition unit 32, a related information acquisition unit 33, a condition determination unit 34, a communication control unit 35, and a notification unit 36 when the program recorded in the storage device 14*b* is read into the RAM 13*b* and executed by the CPU 11*b*. Note that, in the present embodiment, each of the functions of the inspection server 30 is executed by the CPU 11*b* as a versatile processor, but some or all of these functions may be executed by one or a plurality of dedicated processors.

The dictionary data acquisition unit 31 acquires the dictionary data 41 delivered by the dictionary server 40. The dictionary data 41 is periodically updated. The dictionary data acquisition unit 31 periodically acquires the latest dictionary data 41 from the dictionary server 40 to maintain the dictionary data 41 held by the inspection server 30 in the latest state.

When implementing a security measure for any of the nodes 90, to provide more proper measure information, the measure information acquisition unit 32 acquires proper measure information in accordance with an attribute of a program that has caused the target node 90 to fail to fulfill the security condition. The measure information includes information related to the updating of the program such as a recommended update version.

Figure 4:
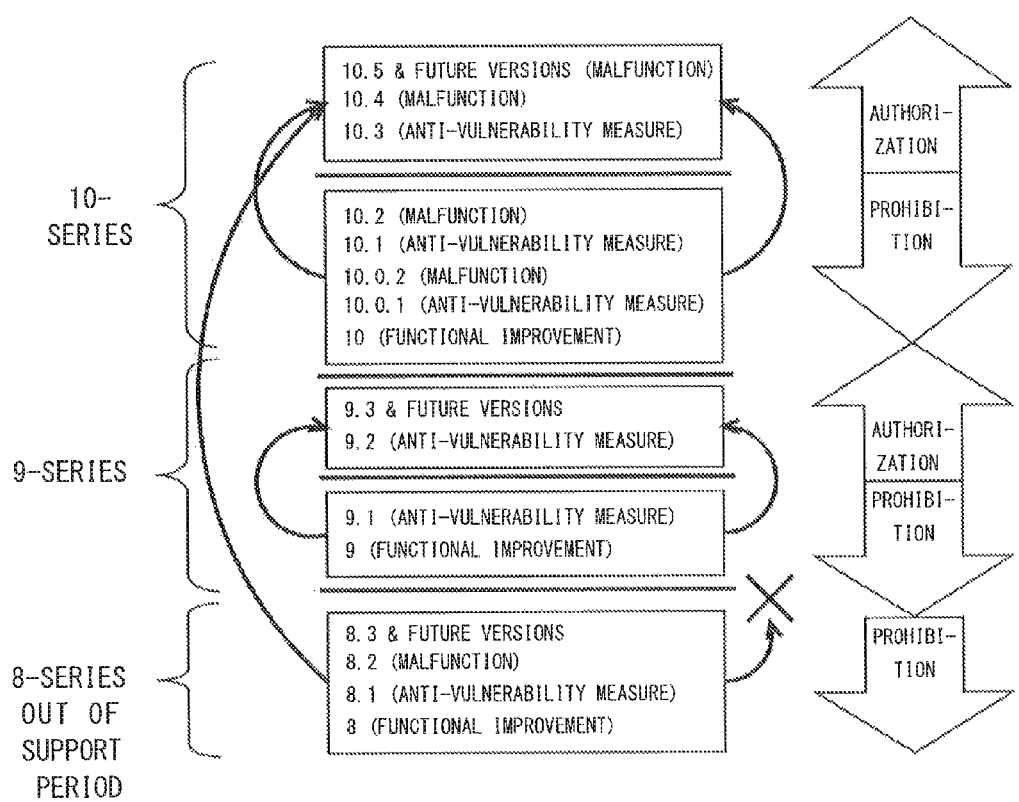
FIG. 4 is a view showing a version management method for implementing a proper security measure in the embodiment.

FIG. 4 is a view showing a version management method for implementing a proper security measure in the present embodiment. In the present embodiment, using the dictionary data 41, a security measure involving version management described later is implemented.

In the present embodiment, the measure information including the recommended update version and the like is determined based on a scope to which a pre-update version belongs. Here, the scope is a range of versions for managing target versions to each of which a correction program is to be provided by a program provider. For example, when the program provider manages the versions of a program as major versions and minor versions and determines a period during which the correction program is provided (support period) for each of the major versions, a range of the versions included in one major version corresponds to one scope. However, since the scope is the range of versions for managing the target versions to which the correction program is to be provided, the scope is not necessarily determined on a per major-version basis. In addition, the major version may be shown by a numerical value ("10" when a version number is "10.4.3.1") located in the highest order in the version number (e.g., "10.4.3.1") separated by periods or may be shown by a numerical value ("4" when the version number is "10.4.3.1") located in the second highest order. In the example shown in FIG. 4, the three scopes of "10-Series", "9-Series", and "8-Series" are defined.

In the present embodiment, when the node 90 does not satisfy the security condition, the measure information transmitted to the node 90 for notification is acquired. The acquired measure information is determined in accordance with the attribute of the one of the programs installed in the node 90 which has caused the node 90 to fail to fulfill the security condition. For example, when there are a plurality of update versions available for the program installed in the node 90, measure information including information showing the recommended update version that has been determined in accordance with the attribute of the program is acquired. In the example shown in FIG. 4, when the current version is "8.1" or "9.1", the security condition is not satisfied (the current version is a candidate version to be prohibited) so that the program needs to be updated. However, there are a plurality of updates such as "9.3" and "10.5". In the present embodiment, in accordance with the attribute of the program, the recommended update version is set in the measure information described later to allow the node 90 to perform proper updating in accordance with the attribute of the program.

Here, the attribute of the program is an attribute which allows determination of, e.g., compatibility between the program in a pre-update version and the program in a post-update version, a support period during which the correction program is provided by the program provider, the possibility that the program in a newer version can be installed in the same node without removing the program in an older version therefrom, or the like.

For example, for a program having the attribute of a relatively small compatibility problem, measure information is acquired in which the latest version among all the major versions that are provided is the recommended update version (which is "10.5" in the example shown in FIG. 4).

On the other hand, for a program having the attribute of a relatively large compatibility problem, measure information is acquired in which the latest version in the scope including the version currently installed in the node 90 is the recommended update version (which is 9.3 when the current version is 9.1 in the example shown in FIG. 4). However, for the scope to which the correction program is no longer provided (which is 8.1 or the like in the example shown in FIG. 4), measure information to be acquired may be flexibly set in accordance with the program attribute. For instance, the measure information to be acquired may lead the node 90 to the latest version (which is 10.5 in the example shown in FIG. 4) in the latest scope or notify the node 90 of no available update (the cross mark shown in FIG. 4). Details of the measure information acquired in accordance with the attribute of the program will be described later.

Examples of the program having the relatively small compatibility problem include a program for decoding and outputting contents data produced in accordance with a predetermined format (hereinafter referred to as "contents-output-type program"). Examples of the contents-output-type program include "Adobe Reader (registered trademark)", "Adobe Flash Player (registered trademark)", and the like. On the other hand, examples of the problem having the relatively large compatibility problem include a program for interpreting and executing a program including various functions (hereinafter referred to as "program-execution-environment-type program"). Examples of the program-execution-environment-type program include "Java (registered trademark) SE Runtime", and the like.

FIG. 5 is a view showing a configuration of the dictionary data 41 according to the present embodiment. The dictionary data 41 includes scope information, version information, and the measure information.

The scope information is for identifying a plurality of version ranges (referred to as the "scopes" in the present embodiment) for managing target versions to each of which a correction program is to be provided by the program provider. More specifically, the scope information includes identifiers (application IDs) for identifying programs that can be installed in the node 90, identifiers (scope IDs) for identifying the scopes, information (maintenance state) showing the state of provision of correction programs by the program providers, information (update) showing updates when there is no authorized update in the same scope, information (detection method) showing whether or not a plurality of versions are to be detected as update versions, and the like.

The version information is information which holds security information for the versions of the programs in association with the versions thereof. In the present embodiment, the version information is referenced as a security condition. More specifically, the version information includes identifiers (application scope IDs) for identifying the programs and the scopes, detailed information on patches such as patch numbers, information showing the upper and lower limits of the target versions, information (candidate version to be prohibited/candidate version to be authorized) showing whether or not communication by the node 90 is to be prohibited when the version in question is detected from the node 90 during inspection, the URLs of the release notes of the patches, the URL of the security information, and the like.

In the example shown in FIG. 4, the 10-series is the scope in which a patch is supplied for maintenance by the vendor and a version newer than a new version including a patch that has been subjected to the latest anti-vulnerability measure is the "Candidate Version to be Authorized" (each of the other versions in the 10-series is the "Candidate Version to be Prohibited). The 9-series is the scope in which a patch is supplied for maintenance by the vendor and a version newer than the latest patch is the "Candidate Version to be Authorized" (each of the other versions in the 9-series is the "Candidate Version to be Prohibited). On the other hand, each of the scopes including and previous to the 8-series is the scope in which a patch is not supplied for maintenance by the vendor and each of the versions therein is the "Candidate Version to be Prohibited". In the present embodiment, a version having a security problem (e.g., having vulnerability) is set as the candidate version to be prohibited.

Note that, since the version information has the information showing the upper and lower limits of the target versions, it is possible to collectively define a plurality of versions including undefined versions. This allows a reduction in the amount of the dictionary data and handling of such a case where a version newer than the defined versions is further released. To describe it using the case shown in FIG. 4, it is possible to, e.g., include 10.1 and the previous versions in one record without individually listing up these versions or include the versions previous to 9.2 for which the anti-vulnerability measure has been completed in one record without individually listing up the these versions. In addition, when the 8-series and the versions older than that are versions to each of which the vendor does not supply a patch for maintenance, all of these versions can be handled as the candidate versions to be prohibited.

The measure information is information including a solution method to a security problem. The measure information is presented to the target node 90 when it is determined in inspection by the inspection server 30 that a program in a version set as the candidate version to be prohibited in the version information is installed in the node 90 to be inspected. More specifically, the measure information includes identifiers for identifying the program and the scope (application/scope IDs), a message to be output by the target node 90, a troubleshooting URL to be output by the target node 90, a troubleshooting program to be executed by the target node 90 and parameters to be used during the execution thereof, execute authority (manager authority/user authority) when the target node 90 is caused to execute the troubleshooting program, the interactive mode (interactivity is needed/interactivity is unneeded) of the troubleshooting program, whether or not automatic execution of the troubleshooting program is allowed (automatic execution/manual execution), and the like.

Into the message to be output by the target node 90, various information can be included. For example, when, e.g., the target program to be updated is a program which allows a newer version thereof to be installed in the same node without involving removal of an older version thereof, the older version having vulnerability may undesirably remain. Accordingly, an instruction to uninstall the older version may be included in the message to be output by the target node 90. The manager can edit the message and URL each set in the dictionary data 41. For the editing of the message, it is possible to use an abstract letter string which is replaced with the name of the program, the version thereof, or the like when the message is output by the node 90.

<Flow of Processing>

Next, the flow of processing executed by the inspection system 1 according to the present embodiment will be described using flow charts. Note that the specific content of the processing and the order of the processing which are shown in the flow charts described below are an example for implementing the present invention. The specific content of the processing and the order of the processing may be selectively set appropriately in accordance with embodiments of the present invention.

Figure 6:
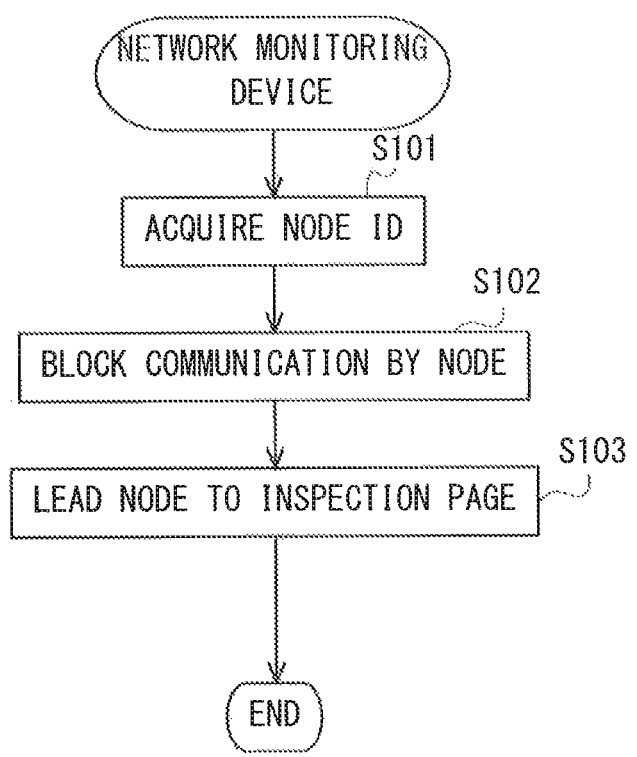
FIG. 6 is a flow chart showing the flow of node management processing according to the embodiment.

FIG. 6 is a flow chart showing the flow of node management processing according to the present embodiment. The node management processing according to the present embodiment is started upon participation of the node 90 of a user in the network segment 2 or regularly executed in the inspection system 1 described above.

First, the network monitoring device 20 acquires node IDs (device identification information) which allow the individual nodes 90 belonging to the network segment 2 to be identified (Step S101). In the present embodiment, as the node IDs, the MAC addresses of the nodes 90 are used. The network monitoring device 20 acquires all packets flowing in the network segment 2, including ones not directed to the MAC address thereof, to thereby acquire a broadcast packet such as an ARP packet for an address resolution request transmitted by the node 90 or the like and acquire the MAC address of the node 90.

Then, the network monitoring device 20 compares the acquired MAC address of the transmitter of the packet with the MAC addresses held in the storage device 14a of the network monitoring device 20. As a result of the comparison, when the acquired MAC address of the transmitter of the packet is not held in the storage device 14a of the network monitoring device 20, the network monitoring device 20 determines that the new node 90 is connected to the network segment 2 and acquires the MAC address of the new node 90. Note that, as the node ID, information other than the MAC address may be used. For example, as the node ID, an IP address may be used instead of the MAC address.

Next, the network monitoring device 20 blocks communication by the node 90 (Step S102). The network monitoring device 20 can block the communication by the node 90 using, e.g., a method which physically blocks the communication by the node 90, a method which leads the destination of a packet from the node 90 by ARP spoofing, or the like. Further, the network monitoring device 20 performs lead processing to an inspection page (Step S103). In the lead processing to the inspection page, the communication by the node 90 can be led to the inspection page using a method which redirects the communication by the node 90 to the inspection server 30, a method which transfers the packet acquired from the node 90 by ARP spoofing to the inspection server 30, or the like.

The inspection server 30 receives the led HTTP connection and transmits a Web page for inspection to the node 90. Upon receipt of the Web page for inspection, the node 90 displays the Web page for inspection. In the inspection system 1 according to the present embodiment, an input field for inputting information for authentication (such as, e.g., a user ID or password) for authenticating the user of the node 90 or the node 90 is included in the Web page for inspection. The user requests authentication by inputting the information for authentication using the input device (such as a keyboard or mouse) of the node 90. However, depending on an embodiment, another method may be used as a method for authentication or, alternatively, authentication need not be performed.

FIG. 7 is a flow chart showing the flow of inspection processing according to the present embodiment. The inspection processing according to the present embodiment is started upon input of the information for authentication by the user in the Web page for inspection displayed by the node 90.

The node 90 transmits an authentication request including the information for authentication (such as a user ID, a password, or the node ID acquired in Step S101) input by the user and an inspection request to the inspection server 30 (Step S201). Upon receipt of the authentication request and the inspection request, the inspection server 30 compares the user ID, password, or the like included in the received information with the user information held in advance to authenticate the user or the node 90 (Step S202).

In addition, the node 90 requests, of the inspection server 30, collection target information showing information (hereinafter referred to as "inventory") to be collected for inspection (Step S20). Upon receipt of the request for the collection target information (Step S204), the related information acquisition unit 33 of the inspection server 30 acquires the collection target information generated using the scope information and the version information each included in the dictionary data 41 (Step S205) and notifies the node 90 (Step S206).

Upon receipt of the collection target information showing the information (inventory) for inspection to be collected (Step S207), the node 90 collects the inventory shown by the received collection target information (Step S208). Specifically, the node 90 searches the log held by the node 90, a list of programs, a program configuration file, a program management file (such as, e.g., a registry), and the like using the search key shown by the collection target information to collect the inventory. The node 90 transmits the collected inventory to the inspection server 30 (Step S209).

The inspection server 30 receives the inventory transmitted by the node 90 (Step S210). That is, the related information acquisition unit 33 of the inspection server 30 requests the collection of the inventory of the node 90 to cause the node 90 to collect the inventory and receives the collected inventory, thus acquiring program-related information related to the programs installed in the terminal (node 90) connected to the network (Steps S206 to S210).

Then, the inspection server 30 checks the content of the received inventory to inspect the node 90. Specifically, the condition determination unit 34 of the inspection server 30 checks whether or not the versions of the programs installed in the node 90 (program-related information) which are included in the inventory are set as the "Candidate Versions to be Authorized" in the version information in the dictionary data 41 to determine whether or not the node 90 in question satisfies the security condition (Steps S211 and S212). Here, when the program in the version set as the candidate version to be prohibited in the version information included in the dictionary data 41 is extracted, the condition determination unit 34 determines that the security condition is not satisfied. When it is determined that the environment of the node 90 satisfies the security condition as a result of the determination, the inspection is completed. On the other hand, when it is determined that the environment of the node 90 does not satisfy the security condition as the result of determination, the node 90 fails an inspection test.

When it is determined that the environment of the node 90 does not satisfy the security condition as a result of the determination, i.e., when the node 90 failed the inspection test, the measure information acquisition unit 32 of the inspection server 30 executes measure information acquisition processing to acquire the measure information for allowing the node 90 to satisfy the security condition (Step S213). The measure information acquisition unit 32 retrieves measure information in accordance with the attribute of the program which has kept the node 90 from satisfying the security condition from the dictionary data 41 to acquire the measure information.

Here, even when there are a plurality of update versions available for the program installed in the node 90, by searching the dictionary data 41 having the configuration described using FIG. 5, the measure information acquisition unit 32 can acquire the measure information including information showing the recommended update version that has been determined in accordance with the attribute of the program.

As described using FIGS. 4 and 5, the dictionary data 41 is set in advance to be able to acquire proper measure information in accordance with the program attribute. That is, the measure information acquisition unit 32 retrieves measure information in accordance with the current version of the target program to thereby acquire measure information in which the latest version in the scope including the version currently installed in the node 90, the latest version in the latest scope that is provided, or the like is the recommended update version for the target program in accordance with the attribute of the program.

When the version currently installed in the target node 90 is included in the scope for which the provision of the correction program is finished, the measure information acquisition unit 32 retrieves measure information in accordance with the current version of the target program to thereby acquire measure information in which the latest version in the latest scope is the recommended update version or measure information including a notification of no available update in accordance with compatibility which can be recognized from the program attribute.

Note that, when the version currently installed in the target node 90 is included in the scope for which the provision of the correction program is finished, the measure information acquisition unit 32 may acquire measure information in which the latest version in the latest scope is the recommended update version or measure information in which a given version set in advance by the manager in the dictionary data 41 is the recommended update version in accordance with compatibility which can be recognized from the program attribute.

By further retrieving measure information in accordance with the current version of the target program, when the target program is determined to be a program which allows a newer version thereof to be installed in the same node without involving removal of an older version thereof based on the attribute of the program, the measure information acquisition unit 32 acquires measure information including an instruction to uninstall the older version.

On the other hand, when it is determined that the environment of the node 90 satisfies the security condition as a result of the determination, i.e., when the node 90 passed the inspection, the communication control unit 35 of the inspection server 30 transmits a block removal request to the network monitoring device 20 to authorize communication by the target node 90 via the network (Steps S214 and S215). The block removal request includes a node ID related to the result of the inspection and block removal authorization information showing that the blocking of communication by the node 90 by the network monitoring device 20 may be removed. Upon receipt of the block removal request, the network monitoring device 20 closely examines the content of the block removal request to determine the legitimacy of the request. When determining that the block removal request is legitimate, the network monitoring device 20 holds the corresponding MAC address as a MAC address indicating the inspected node 90 in the storage device 14*a* (Step S216). Upon receipt of the block removal request, the network monitoring device 20 removes the blocking of the communication for the node 90.

The notification unit 36 of the inspection server 30 transmits the result of the inspection, i.e., the result of determining whether or not the environment of the node 90 satisfies the security condition as a Web page to the node 90 for notification (Step S217). Note that, when the node 90 failed the inspection test in Step S212, the inspection result transmitted here includes the measure information acquired in Step S213.

Upon receipt of the inspection result (Step S218), the node 90 outputs the inspection result (or measure information when the inspection result includes the measure information) and implements the measure shown in the measure information (Step S219). The measure implemented here includes execution of processing in accordance with the information included in the received measure information, outputting of the information, and the like. For example, the outputting of the message (such as, e.g., the instruction to uninstall the older version) included in the measure information, the outputting of the information shown in the troubleshooting URL, the execution of the troubleshooting program (when parameters to be used during the execution thereof are specified in the measure information, the parameters are specified), and the like is performed as the measure.

<Variation>

FIG. 8 is a flow chart showing a variation of the measure information acquisition processing according to the present embodiment. The processing shown in the present flow chart may be executed instead of the measure information acquisition processing shown in Step S213.

The attribute of the program referenced in the present flow chart allows determination of compatibility between the program in a pre-update version and the program in a post-update version, a support period during which the correction program is provided by the program provider, the possibility that the program in a newer version can be installed in the same node without removing the program in an older version therefrom, or the like. In the example shown in the present flow chart, the program is evaluated in three grades depending on the level of the compatibility problem. A "first attribute", a "second attribute", and a "third attribute" show progressively larger compatibility problems in this order. Specifically, it is assumed that a program having a relatively small compatibility problem, such as a contents-output-type program, has the "first attribute" or "the second attribute" and a program having a relatively large compatibility problem, such as a program-execution-environment-type program, has the "third attribute". In the present embodiment, a description will be given of the case where the three attributes are set as the program attributes, but the number of the attributes of the program to be determined is not limited to the example shown in the present embodiment. Further, a method for categorizing the attributes is not limited to the method shown in the present embodiment.

First, the measure information acquisition unit 32 references the content of the inventory and determines the attribute of the program based on the name of the program installed in the node 90 or the like (Step S301).

However, the attribute of the program may be determined based on a behavior of the program, a behavior of an installer for the program, or the like. In this case, the inspection server 30 further includes an attribute determination unit which acquires the program installed in the node 90 or the installer for the program and determines the attribute of the program based on the behavior of the program or the installer (the illustration thereof is omitted). A criterion for determining the attribute may be acquired from the dictionary server 40. That is, the attribute determination unit can determine the attribute of the program by comparing the behavior of the program or the installer for the program with behavior information associated with the attribute of the program.

Specifically, it can be assumed from, e.g., the content of data read in accordance with the execution of the program or the like (behavior of the program) whether the program in question is a contents-output-type program or a program-execution-environment-type program. It can be assumed from, e.g., authorization of the installation of different versions (behavior of the installer) that the program in question has a relatively large compatibility problem or the like. In Steps S305 and S308 described later also, the attribute of the program may similarly be determined based on the behavior.

When it is determined that the program is a program having the first attribute in Step S301, the measure information acquisition unit 32 acquires the measure information in which the latest version in the latest scope that is provided is the recommended update version for the target program (Step S302). Then, the processing advances to Step S308.

On the other hand, when it is determined that the program is not a program having the first attribute, the measure information acquisition unit 32 determines whether or not the scope to which the version of the target program belongs is within the support period during which the correction program is provided by the program provider (Step S303). When it is determined that the version in use is within the support period, the measure information acquisition unit 32 acquires the measure information in which the latest version in the scope including the currently installed version is the recommended update version for the target program (S304). Then, the processing advances to Step S308.

On the other hand, when it is determined that the version in use is not within the support period, the measure information acquisition unit 32 determines the attribute of the program (Step S305). Here, when the program is determined to be a program having the second attribute, the measure information acquisition unit 32 acquires the measure information in which the latest version in the latest scope that is provided is the recommended update version for the target program (Step S306). Then, the processing advances to Step S308.

In Step S305, when the program is determined to be a program having the third attribute, the measure information acquisition unit 32 acquires the measure information including a notification of no available update (Step S307). Then, the processing shown in the present flow chart is ended.

When the measure information including the recommended update version is acquired (Step S302, S304, or S306), the measure information acquisition unit 32 references the content of the inventory and determines the attribute of the program based on the name of the program installed in the node 90 or the like (Step S308). Here, based on the attribute, the possibility (the possibility of coexistence of different versions) is determined that the program in a newer version can be installed in the same node without removing the program in an older version.

When it is determined in Step S308 that there is the possibility of the coexistence of different versions, the measure information acquisition unit 32 acquires the measure information including the instruction to uninstall the older version (Step S309). Then, the processing shown in the present flow chart is ended.

Note that, in the embodiment described using FIG. 8, the measure information including a notification of no available update is to be acquired when the scope to which the version in use belongs is out of the support period and the program is a program having a relatively large compatibility problem, such as a program-execution-environment-type program. However, instead of such measure information, measure information may be acquired in which a given version set in advance by the manager in the dictionary data 41 is the recommended update version.

What is claimed is:

1. An information processing apparatus, comprising:
    a memory; and
    a processor configured to:
    acquire program-related data related to a program installed in a terminal connected to a network;
    determine whether or not the program-related data satisfies a predetermined security condition;
    determine a grade of the program as an attribute which represents a character of the program, the grade being evaluated in a plurality of grades depending on a level of compatibility between the program, to be upgraded, in a pre-update version and the program, to be upgraded, in a post-update version based on a style of behavior of the program or an installer for the program;
    acquire, when it is determined that the program-related data does not satisfy the security condition, measure information for allowing the terminal to satisfy the security condition in accordance with the attribute of the program, the attribute allowing the level of compatibility to be recognized; and
    notify the terminal of the measure information by generating a data including the measure information and sending the data to the terminal the measure information being acquired in accordance with the determination of the grade of the program as the attribute which allows the level of compatibility of the programs to be recognized.

2. The information processing apparatus according to claim 1, wherein, when there are a plurality of update versions available for the program installed in the terminal, the processor acquires measure information including information showing a recommended update version determined in accordance with the attribute of the program.

3. The information processing apparatus according to claim 1, the processor further configured to:
    acquire dictionary data including the security condition and the measure information, wherein
    the processor determines whether or not the program-related data satisfies the security condition included in the dictionary data, and
    the processor acquires the measure information in accordance with the attribute of the program from the dictionary data.

4. The information processing apparatus according to claim 3, wherein
    the dictionary data further includes version range information which allows a plurality of version ranges for managing target versions to each of which a correction program is to be provided by a program provider, to be discriminated from each other, and
    the processor measure information in which a latest version in the version range including a version currently installed in the terminal or a latest version in the latest version range provided for the program is the recommended update version for the program in accordance with the attribute of the program.

5. The information processing apparatus according to claim 4, wherein the attribute further allows a support period during which the correction program is provided by the program provider, to be recognized.

6. The information processing apparatus according to claim 5, wherein, when it is determined that the version currently installed in the terminal is included in the version range for which the provision of the correction program is finished based on the support period that can be recognized from the program attribute, the processor acquires measure information in which the latest version in the latest version range is the recommended update version or measure information including a notification of no available update in accordance with the compatibility that can be recognized from the program attribute.

7. The information processing apparatus according to claim 5, wherein, when it is determined that the version currently installed in the terminal is included in the version range for which the provision of the correction program is finished based on the support period that can be recognized from the program attribute, the processor acquires measure information in which the latest version in the latest version range is the recommended update version or measure information in which a given version set in advance is the recommended update version in accordance with the compatibility that can be recognized from the program attribute.

8. The information processing apparatus according to claim 1, wherein
the attribute allows a possibility that the program in a newer version can be installed in the same terminal without removing the program in an older version therefrom, to be recognized, and
when it is determined that the program is a program which allows a newer version thereof to be installed in the same terminal without involving removal of an older version thereof based on the attribute of the program, the processor acquires measure information including an instruction to uninstall the older version.

9. The information processing apparatus according to claim 1, wherein the processor compares the behavior of the program or the installer for the program with behavior information associated with the attribute of the program to determine the attribute of the program.

10. The information processing apparatus according to claim 1, the processor further configured to:
authorize, when it is determined that the program-related data satisfies the security condition, communication by the terminal via the network.

11. A method to be implemented by a computer, comprising:
acquiring program-related data related to a program installed in a terminal connected to a network;
determining whether or not the program-related data satisfies a predetermined security condition;
determining a grade of the program as an attribute which represents a character of the program, the grade being evaluated in a plurality of grades depending on a level of compatibility between the program, to be upgraded, in a pre-update version and the program, to be upgraded, in a post-update version based on a style of behavior of the program or an installer for the program;
acquiring, when it is determined that the program-related data does not satisfy the security condition, measure information for allowing the terminal to satisfy the security condition in accordance with the attribute of the program, the attribute allowing the level of compatibility to be recognized; and
notifying the terminal of the measure information by generating a data including the measure information and sending the data to the terminal the measure information being acquired in accordance with the determination of the grade of the program as the attribute which allows the level of compatibility of the programs to be recognized.

12. A non-transitory computer-readable medium recorded with a program for causing a computer to function as:
a related information acquisition unit which acquires program-related data related to a program installed in a terminal connected to a network;
a condition determination unit which determines whether or not the program-related data satisfies a predetermined security condition;
an attribute determination unit which determines a grade of the program as an attribute which represents a character of the program, the grade being evaluated in a plurality of grades depending on a level of compatibility between the program, to be upgraded, in a pre-update version and the program, to be upgraded, in a post-update version based on a style of behavior of the program or an installer for the program;
a measure information acquisition unit which acquires, when it is determined that the program-related data does not satisfy the security condition, measure information for allowing the terminal to satisfy the security condition in accordance with the attribute of the program, the attribute allowing the level of compatibility to be recognized; and
a notification unit which notifies the terminal of the measure information by generating a data including the measure information and sending the data to the terminal the measure information being acquired in accordance with the determination of the grade of the program as the attribute which allows the level of compatibility of the programs to be recognized.

* * * * *